US010057321B2

(12) United States Patent
Matsuhashi

(10) Patent No.: US 10,057,321 B2
(45) Date of Patent: Aug. 21, 2018

(54) IMAGE MANAGEMENT APPARATUS AND CONTROL METHOD CAPABLE OF AUTOMATICALLY CREATING COMMENT DATA RELEVANT TO AN IMAGE

(71) Applicant: CANON KABUSHIKI KAISHA, Tokyo (JP)

(72) Inventor: Kenichi Matsuhashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 14/885,087

(22) Filed: Oct. 16, 2015

(65) Prior Publication Data

US 2016/0119554 A1   Apr. 28, 2016

(30) Foreign Application Priority Data

Oct. 23, 2014   (JP) .................................. 2014-216526

(51) Int. Cl.
| | | |
|---|---|---|
| *H04L 29/08* | (2006.01) | |
| *H04N 21/258* | (2011.01) | |
| *H04N 21/2743* | (2011.01) | |
| *H04N 21/475* | (2011.01) | |
| *H04N 21/81* | (2011.01) | |
| *G06T 7/70* | (2017.01) | |
| *H04N 21/84* | (2011.01) | |

(52) U.S. Cl.
CPC ................ *H04L 67/02* (2013.01); *G06T 7/70* (2017.01); *H04N 21/25841* (2013.01); *H04N 21/2743* (2013.01); *H04N 21/475* (2013.01); *H04N 21/8153* (2013.01); *H04N 21/84* (2013.01); *G06T 2207/30196* (2013.01)

(58) Field of Classification Search
CPC ............... H04N 5/278; H04N 5/23229; H04N 21/25841; H04N 21/2743; H04N 21/475; H04N 21/8153; H04N 21/84; H04L 67/02; G06T 7/004; G06T 7/70; G06T 2207/30196
See application file for complete search history.

(56) References Cited

U.S. PATENT DOCUMENTS

| | | | | |
|---|---|---|---|---|
| 7,636,450 B1 * | 12/2009 | Bourdev | ........... | G06F 17/30256 382/100 |
| 2009/0022403 A1 * | 1/2009 | Takamori | ............. | H04N 19/139 382/195 |
| 2013/0113952 A1 | 5/2013 | Misawa | | |

(Continued)

FOREIGN PATENT DOCUMENTS

JP   2013-097773 A   5/2013

*Primary Examiner* — Luong T Nguyen
(74) *Attorney, Agent, or Firm* — Fitzpatrick, Cella, Harper & Scinto

(57) ABSTRACT

Provided is an image management apparatus including: an acquiring unit configured to acquire data of an image and positional information on a subject included in the image; a computation unit configured to compute a relative positional relationship between a plurality of subjects included in the image in at least a depth direction, based on the acquired positional information on the plurality of subjects included in the image; and a creating unit configured to create a comment data relevant to the image automatically, based on the computed relative positional relationship between the plurality of subjects.

11 Claims, 16 Drawing Sheets

(56) References Cited

U.S. PATENT DOCUMENTS

2013/0328932 A1* 12/2013 Kim .................... H04L 65/403
                                                        345/636
2014/0099070 A1*  4/2014 Makino ................ G11B 27/031
                                                        386/240

* cited by examiner

| COMMENT NUMBER | ATTRIBUTE OF SUBJECT A | ATTRIBUTE OF SUBJECT B | POSITION OF SUBJECT A − POSITION OF SUBJECT B (Z-AXIS) | CHARACTER STRING TO BE CREATED | EXAMPLE |
|---|---|---|---|---|---|
| 1 | PERSON | PERSON | EQUAL_TO OR LESS THAN THRESHOLD | A HAD A PICTURE TAKEN WITH B | TARO HAD A PICTURE TAKEN WITH HANAKO |
| 2 | PERSON | PERSON | GREATER THAN THRESHOLD | A IS BEHIND B | TARO IS BEHIND HANAKO |
| 3 | LANDMARK | PERSON | EQUAL_TO OR LESS THAN THRESHOLD | B WAS IN A | HANAKO WAS AT A TOWER |
| 4 | LANDMARK | PERSON | GREATER THAN THRESHOLD | B WAS IN FRONT OF A | HANAKO WAS IN FRONT OF A TOWER |

*Fig.11*

| | SUBJECT ID OF SUBJECT A ~1201 | SUBJECT ID OF SUBJECT B ~1202 | RELATIVE POSITION BETWEEN SUBJECT A AND SUBJECT B ~1203 |
|---|---|---|---|
| RELATIVE POSITIONAL INFORMATION 1 | | | |
| RELATIVE POSITIONAL INFORMATION 2 | | | |
| RELATIVE POSITIONAL INFORMATION 3 | | | |
| ⌇ | ⌇ | ⌇ | ⌇ |
| RELATIVE POSITIONAL INFORMATION n | | | |

$_nC_2$ ROWS

Fig.12

IMAGE MANAGEMENT APPARATUS AND CONTROL METHOD CAPABLE OF AUTOMATICALLY CREATING COMMENT DATA RELEVANT TO AN IMAGE

BACKGROUND OF THE INVENTION

Field of the Invention

The present invention relates to an image management apparatus and a control method thereof.

Description of the Related Art

It is useful if an image to be managed or posted on a social media platform has a comment added thereto to describe the details or situation shown in the image.

As a method for adding a comment to an image, Japanese Patent Application Laid-open No. 2013-097773 proposes a technique for analyzing the appearance and/or position of a subject in an image to determine a comment and then displaying the comment in the form of a comment balloon in the image.

SUMMARY OF THE INVENTION

According to the technique disclosed in Japanese Patent Application Laid-open No. 2013-097773, the attribute of a subject is restricted to "person." In some cases, however, the information on the positions of subjects including a subject with an attribute other than "person" can better describe the situation shown in the image. For instance, it is highly likely that an image showing people and a building as the subjects is an image taken for memory or for the record. In such a case, the situation shown in the image can be expressed better with not only the positions of the people but also with a combination of the positions of the people and building and the information for identifying the location where the building exists.

The present invention was contrived in view of these aspects, and an object thereof is to provide a technique for creating a comment matching the situation shown in an image by using an image management apparatus capable of automatically adding a comment to an image.

A first aspect of the present invention is an image management apparatus that has: an acquiring unit configured to acquire data of an image and positional information on a subject included in the image; a computation unit configured to compute a relative positional relationship between a plurality of subjects included in the image in at least a depth direction, from positional information on the plurality of subjects; and a creating unit configured to create a comment relevant to the image, based on the relative positional relationship between the plurality of subjects.

A second aspect of the present invention is a control method of the image management apparatus, the method including: an acquiring step of acquiring data of an image and positional information on a subject included in the image; a computation step of computing a relative positional relationship between a plurality of subjects included in the image in at least a depth direction, from positional information on the plurality of subjects; and a creating step of creating a comment relevant to the image, based on the relative positional relationship between the plurality of subjects.

According to the present invention, the image management apparatus thereof that is capable of automatically adding a comment to an image can create a comment matching the situation shown in an image.

Further features of the present invention will become apparent from the following description of exemplary embodiments with reference to the attached drawings.

BRIEF DESCRIPTION OF THE DRAWINGS

FIG. 11 shows an example of a correlation between the position of a subject and a sample comment, according to Embodiment 1;

FIG. 12 shows an example of information on a relative positional relationship between subjects included in an image, according to Embodiment 1;

DESCRIPTION OF THE EMBODIMENTS

Preferred embodiments of the image management apparatus and control method thereof according to the present invention are described hereinafter in detail based on examples and with reference to the drawings. The components described in these embodiments are merely illustrative and not intended to limit the scope of the present invention thereto.

<Embodiment 1>

Figure 1:
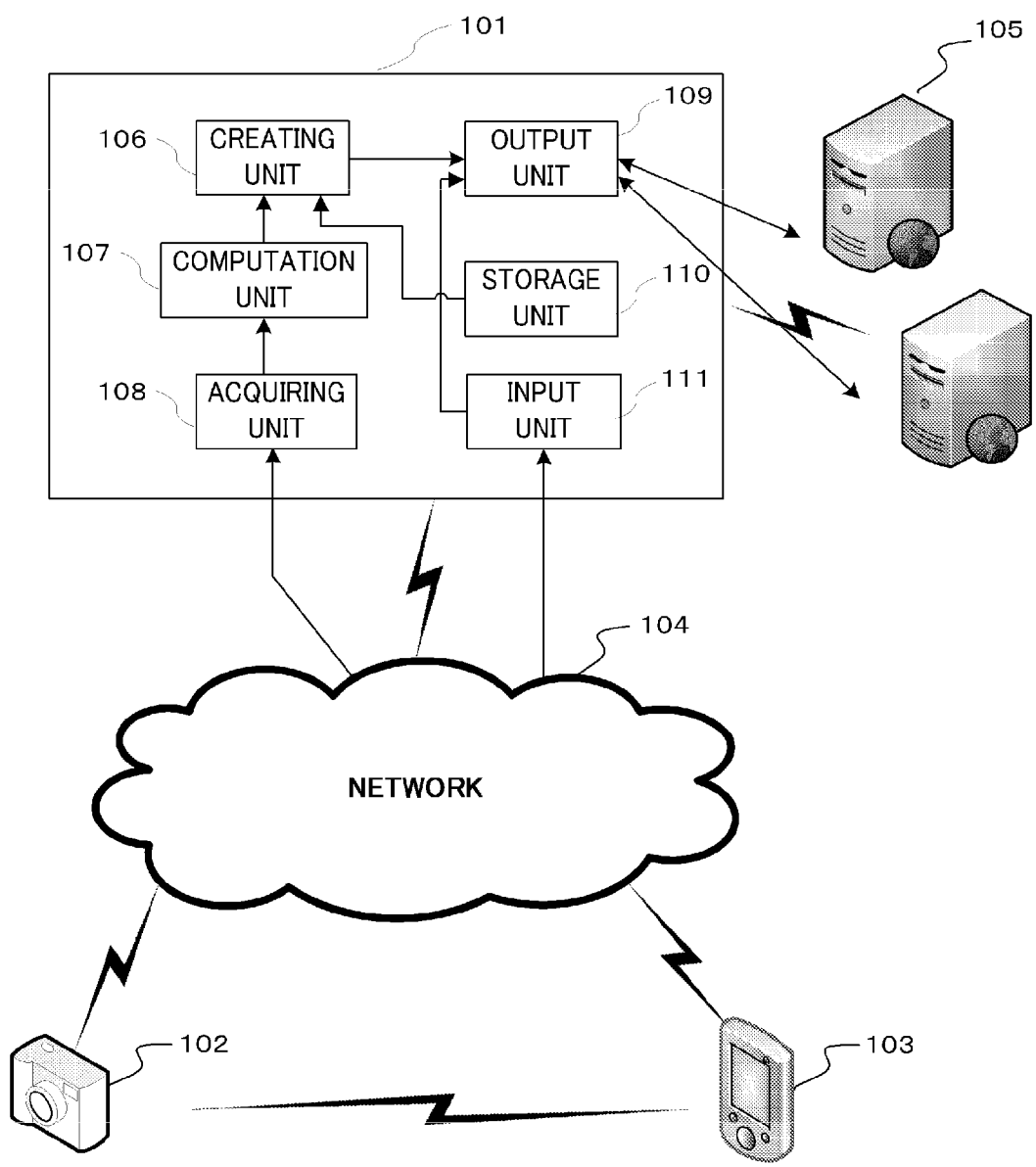
FIG. 1 is a conceptual diagram showing the configuration of an image management system according to Embodiment 1.

FIG. 1 is a conceptual diagram showing the configuration of an image management system according to Embodiment 1.

As shown in FIG. 1, the image management system is configured with an imaging device 102 for capturing an image, a server 101 for acquiring image data from the imaging device 102 through a network 104 and archiving the image data, and a terminal device 103. The terminal device 103 configures the settings for the server 101, acquires the state of the server 101, displays a content thereof, and receives the image data from the imaging device 102. The image data and additional information stored in the server 101 can be transferred to a link 105 such as a social media platform.

An acquiring unit 108 of the server 101 acquires data of an image and positional information on a subject in the image. In Embodiment 1, the acquiring unit 108 acquires the image data and the information on the subject (the positional information and additional information) from the imaging device 102 through the network 104. A computation unit 107 computes a relative positional relationship between a plurality of subjects included in the image in at least a depth direction, from positional information on the plurality of subjects, the image corresponding to the image data acquired by the acquiring unit 108. A creating unit 106 creates a comment data describing the situation shown in the image automatically, based on the relative positional relationship between the plurality of subjects that is computed by the computation unit 107. An output unit 109 outputs, to an external device, display data used for displaying the image data and the comment in association with each other. In Embodiment 1, the output unit 109 outputs the display data to the external device through a network (not shown). In Embodiment 1, the external device is a web server of the link 105 that provides a web service for displaying image data and a comment based on the display data. An input unit 111 receives, from a user, random information (a user comment, etc.) for displaying the image data and the comment in association with each other, from the terminal device 103 through the network 104. The input unit 111 also receives, from the user, an instruction for controlling a display mode of the image data and comment in the web service of the link 105, the instruction being issued using the terminal device 103 through the network 104.

Figure 2:
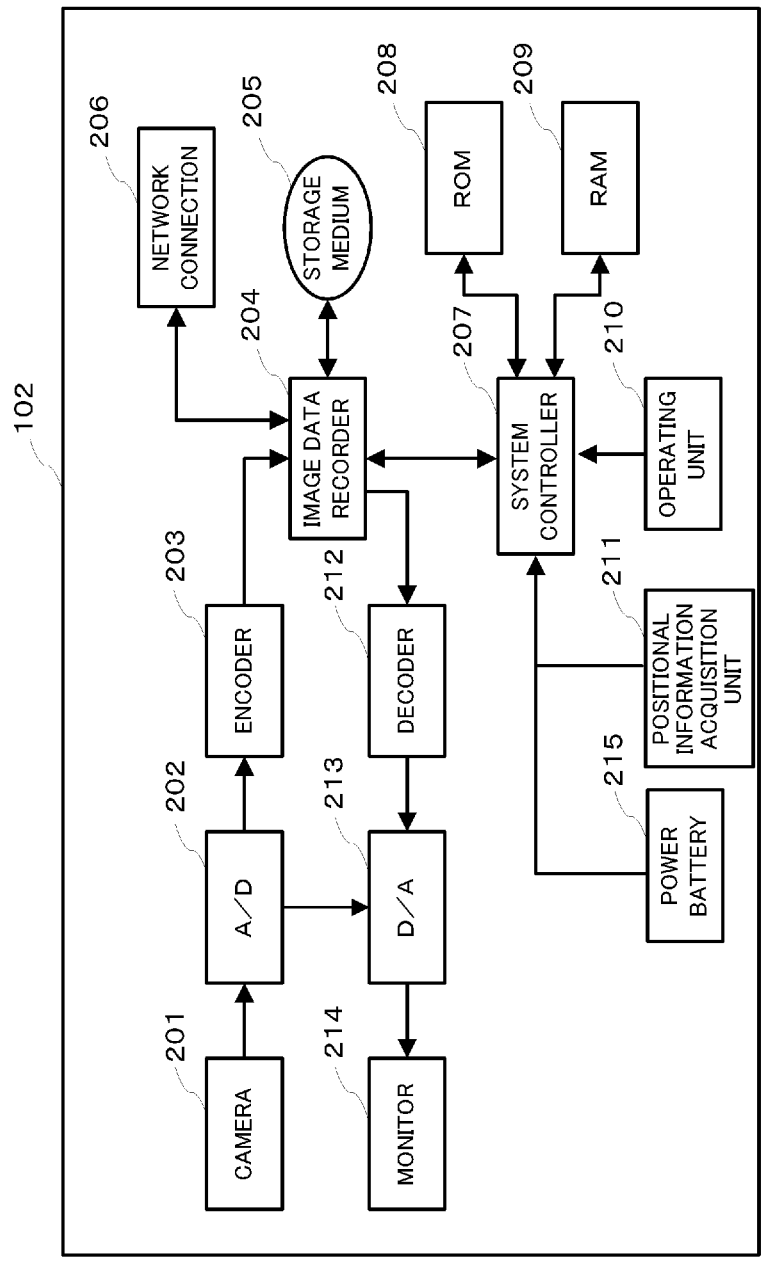
FIG. 2 is a block diagram illustrating the configuration of an imaging device according to Embodiment 1.

FIG. 2 is a block diagram showing the configuration of the imaging device 102.

In FIG. 2, a camera 201 converts an optical image of a subject into an electric signal. An A/D converter 202 receives an analog signal and converts it into a digital signal. An encoder 203 compresses and encodes the digital image data (e.g., in a case where the digital image data is still image data, then the digital image data is compressed and encoded into JPEG). An image data recorder 204 creates a file of the image data (an image file) and stores (records) the image file in a storage medium 205. The storage medium 205 is a randomly accessible storage medium. A network connection 206 transmits the image data to the server 101 through the network 104. A system controller 207 controls an overall operation of the imaging device 102 and has a microcomputer. A ROM 208 saves a control program, an imaging set value file, and various data. A RAM 209 has a control program loading area and the like. An operating unit 210 has an operation panel, a remote control and the like and inputs various data and commands to the imaging device 102 by being operated by the user. A positional information acquisition unit 211 is, for example, a GPS receiver, computes the current position (geographical coordinates) of the imaging device 102 on the earth based on the information received from a GPS satellite, to create positional information expressing the computed current position. Note that the positional information acquisition unit 211 may be connected outside the imaging device 102. A decoder 212 decodes the compressed and encoded digital image data. A D/A converter 213 converts a digital signal into an analog signal. A monitor 214 is a display unit. A power battery 215 supplies power required for driving the imaging device 102.

The control program that is required for realizing various processes according to Embodiment 1 is stored in the ROM 208. However, the control program may be stored in the storage medium 205 such as a memory card. Similarly, the present invention is applicable even when there exists a program on the network.

The imaging device 102 keeps, in the ROM 208, server information containing an address used for accessing the server 101 through the network connection 206, as well as user information for authentication. The imaging device 102 accesses the server 101 using the address contained in the server information, and the server 101 performs authentication based on the user information.

Figure 3A:
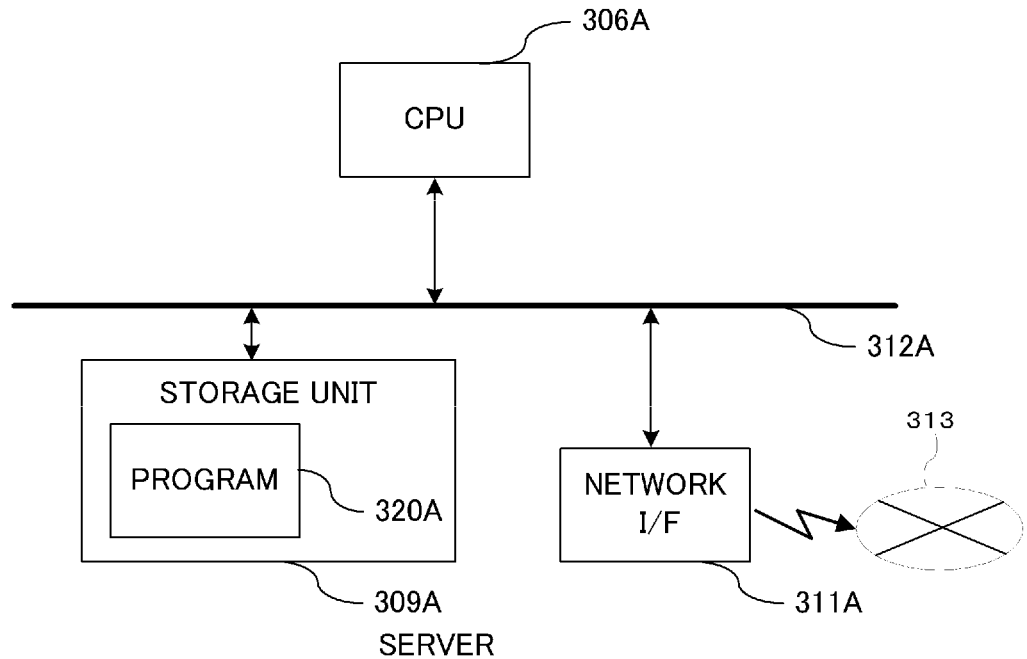
FIGS. 3A and 3B are block diagrams respectively illustrating the configurations of a server and a terminal device according to Embodiment 1.
Figure 3B:
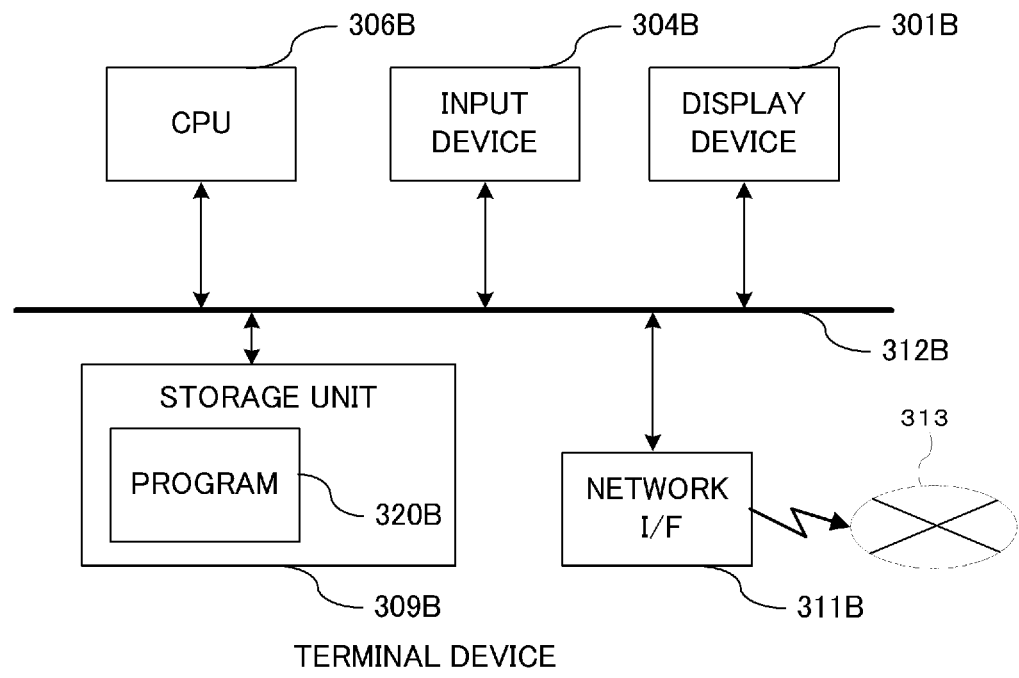

FIGS. 3A and 3B are block drawings showing the configurations of the server 101 and terminal device 103. FIG. 3A shows the configuration of the server 101. FIG. 3B shows the configuration of the terminal device 103.

The server 101 includes a CPU 306A, a network I/F 311A, and a storage unit 309A, and these components are connected by a bus 312A. The server 101 has other components not shown in the diagrams, but the descriptions of these components are omitted herein. A program 320A is stored in the storage unit 309A. The CPU 306A executes the program 320A, thereby realizing various functions described hereinafter. An operating system and various data are stored in the storage unit 309A as well. The network I/F 311A communicates information to the imaging device 102, the terminal device 103, and the link 105 via a network 313. The program may be provided to the CPU 306A by the storage unit 309A, from the network I/F 311A through the network 313, or from a portable storage medium such as a USB memory, CD, or DVD, not shown.

The terminal device 103 is configured by connecting a CPU 306B, a network I/F 311B, an input device 304B, a display device 301B, and a storage unit 309B by means of a bus 312B. The terminal device 103 also has other components not shown in the diagrams, but the descriptions of these components are omitted herein. The input device 304B is used by the user to input instructions and information to a user device, and examples of the input device 304B include a keyboard, a mouse, a touch panel, and the like. The display device 301B is a liquid crystal display, an organic EL display, a touch panel display or the like for displaying characters and images. A program 320B is stored in the storage unit 309B. The CPU 306B executes the program 320B, thereby realizing various functions described hereinafter.

The server 101 may be provided with an input device or a display device; however, in Embodiment 1, the server 101 mainly receives instructions and data from the terminal device 103 and imaging device 102 through the network. Also, the result of executing the program 320A and the like are mainly transmitted in XML format or the like to the terminal device 103 and imaging device 102 through the network by using a protocol such as HTTP, and the display device 301B or the like of the terminal device 103 presents these results and the like to the user. Therefore, the present specification omits the descriptions of such input device or display device that may be equipped in the server 101.

The terminal device 103 is a generic device such as a personal computer, a cellular phone or a Smartphone and capable of transmitting and receiving information through the network 313 by using a standard protocol. Transmission and reception of information using a protocol can be realized by the CPU 306B of the terminal device 103 operating the program 320B.

By having the CPU 306B operate the program 320B, the terminal device 103 accesses the server 101 by using a protocol such as HTTP, and transmits information created in a description language such as XML. Similarly, the terminal device 103 also receives information created in a description language such as HTML or XML. The CPU 306B of the terminal device 103 analyzes the information received in response to an instruction of the program 320B, and displays the analysis result on the display device 301B. Consequently, responses and results corresponding to the instructions or information that are input to the input device 304B by the user are presented to the display device 301B.

Embodiment 1 has described a configuration in which various processes of the terminal device 103 are realized by causing the CPU 306B to execute the program 320B; however, the program 320B may be executed by hardware specialized in realizing various processes or by a dedicated application. In addition, a configuration is possible in which various processes are executed by utilizing a web service on a browser operated by the terminal device 103.

Figure 4:
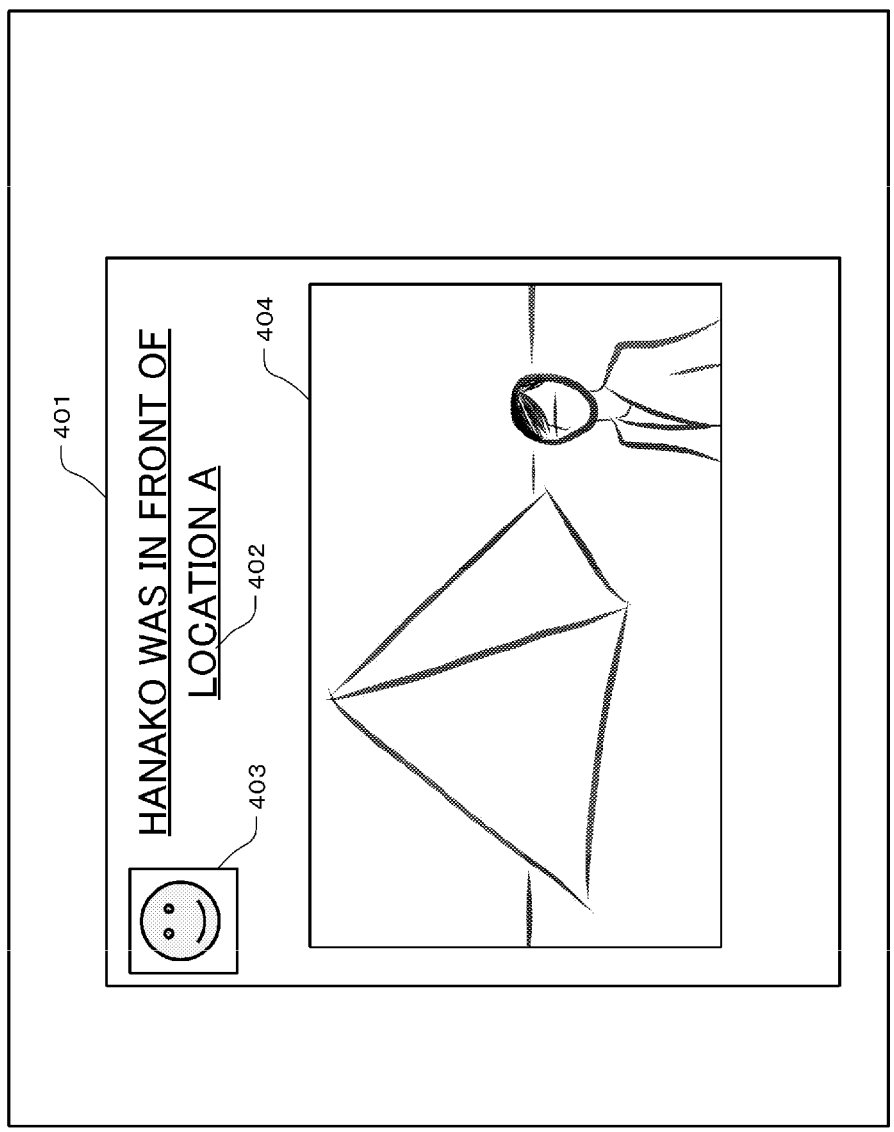
FIG. 4 is a conceptual diagram showing a page of a link on which an image and a comment are displayed.

FIG. 4 is a conceptual diagram showing a page that is displayed on the link 105 based on display data containing image data and a comment, the display data being transmitted from the server 101 to the link 105.

In FIG. 4, a display frame 401 indicates a display range per transmission (e.g., per posted article) containing an image and a comment. The display frame 401 is configured with an image 404, a comment 402 describing the details of the image, and an icon or image 403 representing a member of the link 105. Based on the display data transmitted from the server 101 and consisting of the image data and comment, the link 105 creates a web page available for viewing, such as the one shown in FIG. 4, and transmits the created web page to a terminal that has accessed the link 105. From the terminal device 103 to the server 101, the user can transmit an instruction on how the link 105 draws the web page based on the image data and comment received from the server 101. The input unit 111 of the server 101 can transmit the instruction received from the user, along with the image data and comment, to the link 105, and the link 105 can interpret the instruction and draw a web page based on the instruction from the user. When wishing to display a comment created by the user (a user comment) other than the comment created by the server 101 (the created comment), the input unit 111 of the server 101 receives a comment from the user. The server 101 transmits to the link 105 the user comment along with the image data and created comment. In this case, the link 105 can draw a web page in such a manner that, for example, the user comment is positioned in a line next to the comment 402 shown in FIG. 4, a space below the image 404, or the like.

Figure 5:
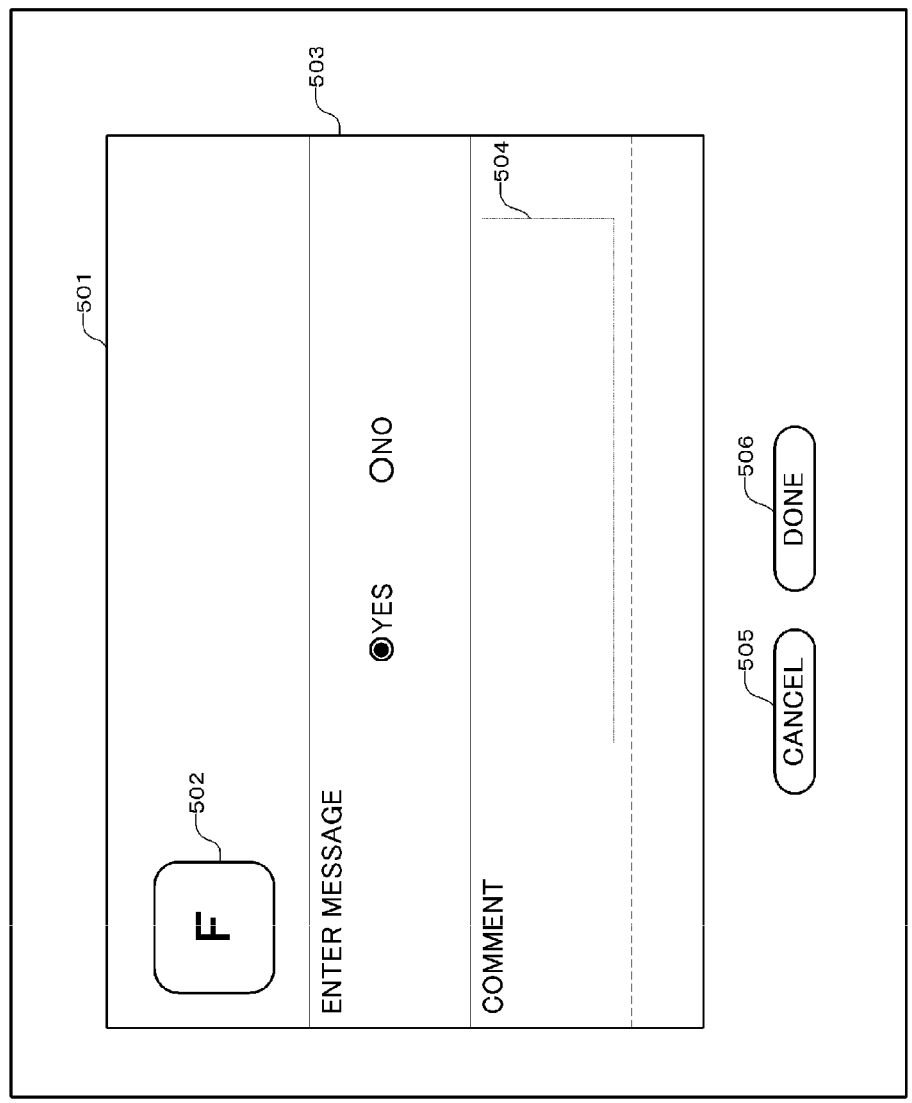
FIG. 5 shows an example of a settings screen used for transmitting the image to the link.

FIG. 5 shows an example of a settings screen that is displayed on the terminal device 103 in order to enable transmission of the user comment and display settings from the terminal device 103.

In FIG. 5, a settings frame 501 contains an icon 502 representing the link 105, a selection frame 503 for designating whether to input the comment 402, and a comment input section 504 for designating a comment to be displayed other than the comment 402. The settings frame 501 is also configured with a done button 506 for executing the settings or making changes, and a cancel button 505 for canceling the settings. A set value that is displayed and set on the terminal device 103 is saved in the server 101 and transmitted to the link 105 at the time of transmission of the image data and comment.

Figure 6:
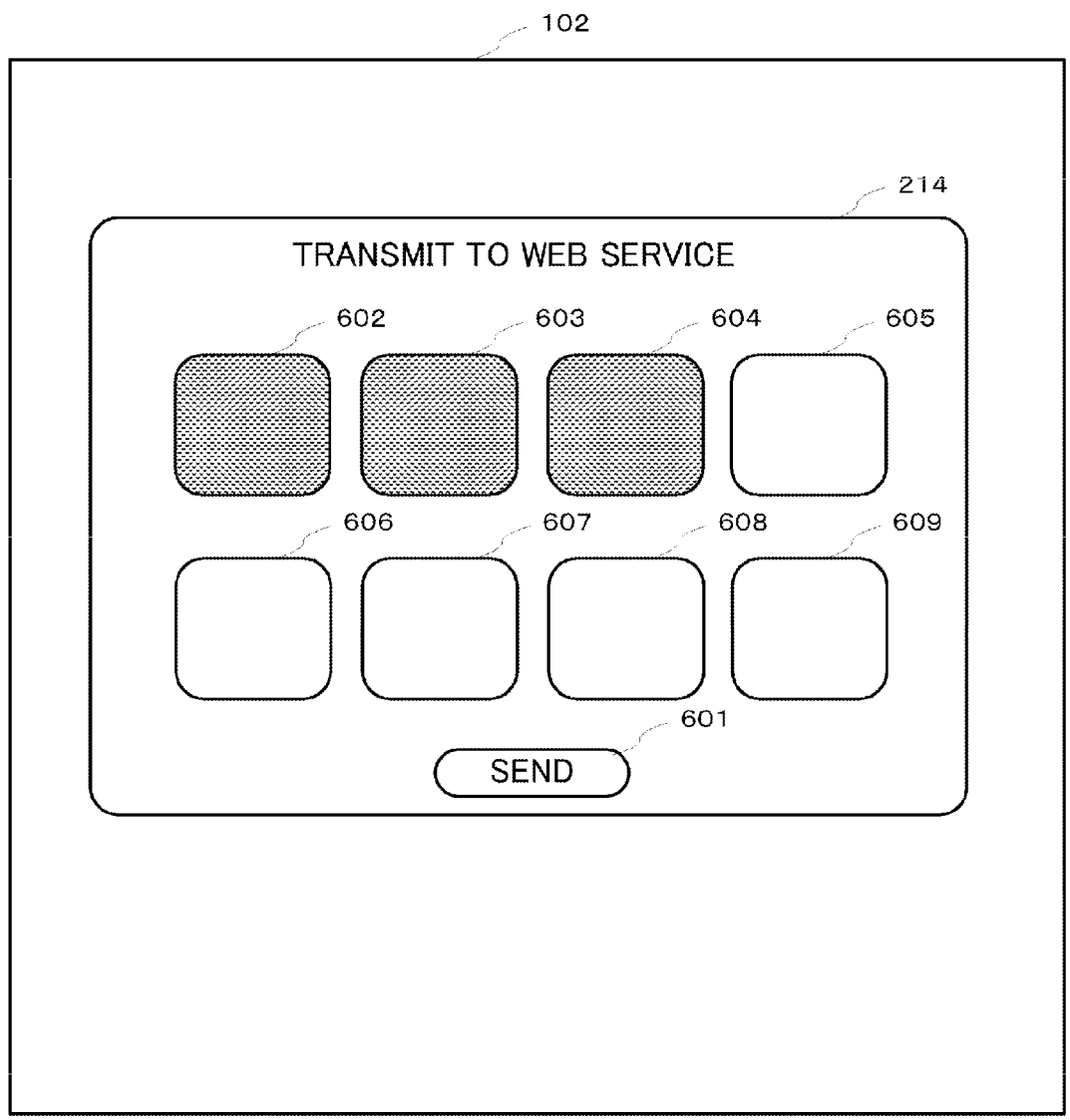
FIG. 6 shows an example of a screen for selecting an image to be transmitted from the imaging device.

FIG. 6 shows an example of an operation screen to be displayed on the monitor 214 of the imaging device 102 to enable selection of the image data to be transmitted to the server 101 or link 105 and the execution of the transmission operation.

In FIG. 6, the user selects an image to be transmitted from among images 602 to 609 and transmits the selected image by pressing a send button 601. An instruction on selecting or transmitting an image can be entered by operating the operating unit 210.

Figure 7:
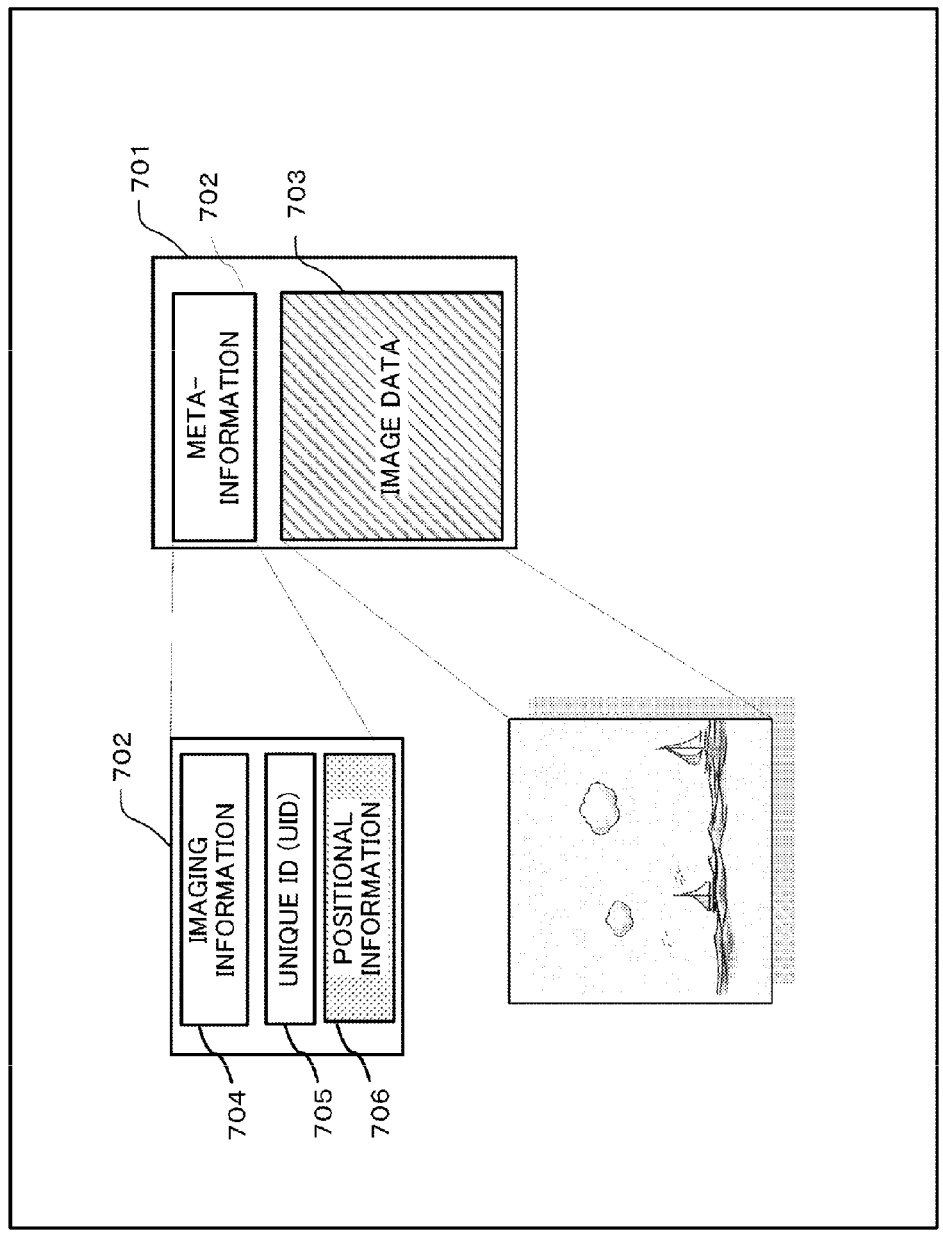
FIG. 7 is a conceptual diagram showing an image file created by the imaging device according to Embodiment 1.

FIG. 7 is a conceptual diagram showing an image file to be created by the imaging device 102.

In FIG. 7, an image file 701 is configured with image data 703 about an image itself, and meta-information 702 (supplementary information) attached to the image data 703. The meta-information 702 is configured with imaging information 704 containing imaging date and time, a unique ID 705 for each image, and positional information 706 indicating the positional information (spatial coordinates) on each subject included in an image. The distance between the imaging device 102 and a subject is obtained by using any of the conventional techniques disclosed in, for example, U.S. Pat. Nos. 8,335,393, 8,855,479, and 8,928,755.

Figure 8:
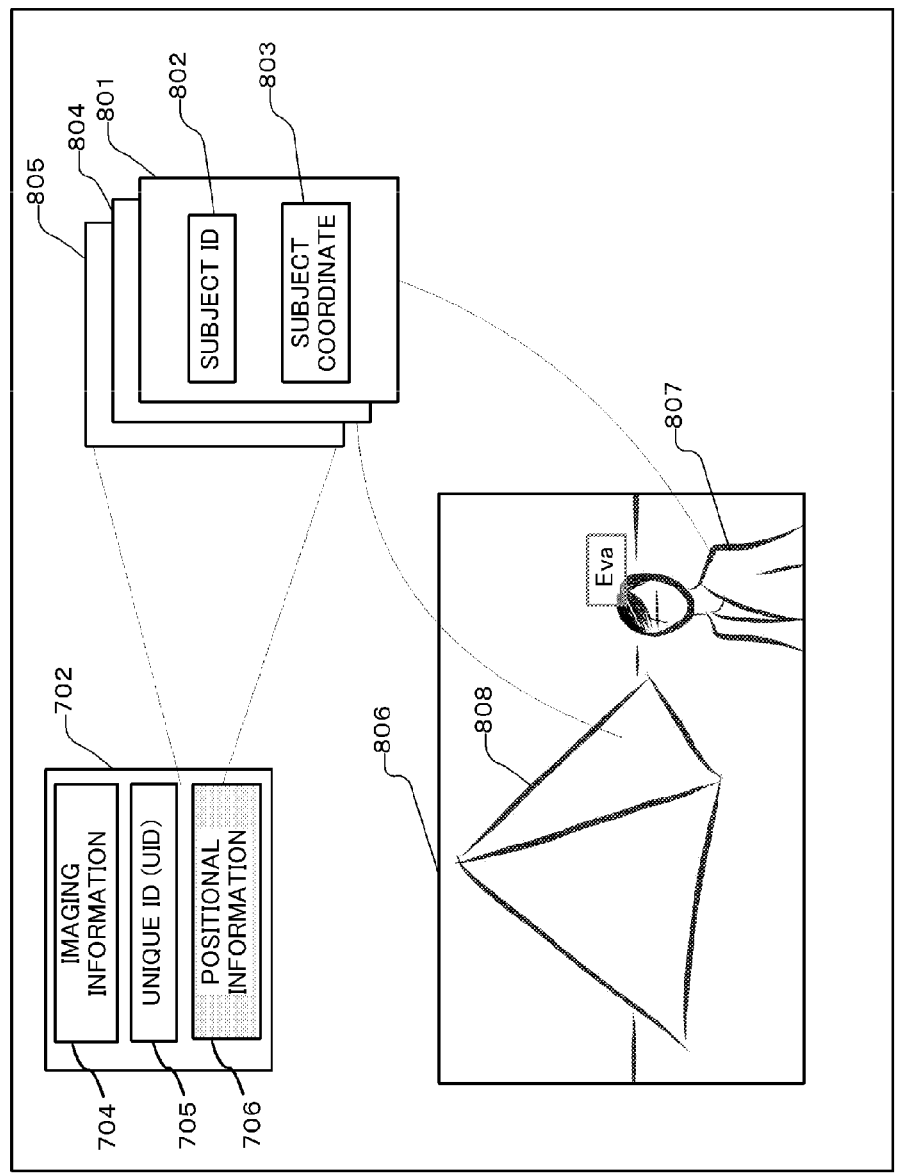
FIG. 8 is a conceptual diagram showing the configuration of positional information according to Embodiment 1.

FIG. 8 is a conceptual diagram showing the configuration of the positional information 706.

In FIG. 8, the positional information 706 is configured with coordinates information 801 of each subject. When an image contains a plurality of subjects, the positional information 706 has coordinates information 804, 805 as much as the number of subjects. The coordinates information 801 on a subject 807 in an image 806 is configured with a subject ID 802 and a subject coordinate 803 that represent the subject 807. For a subject 808 as well, the coordinates information 804 corresponding thereto includes a subject ID and a subject coordinate.

Figure 9:
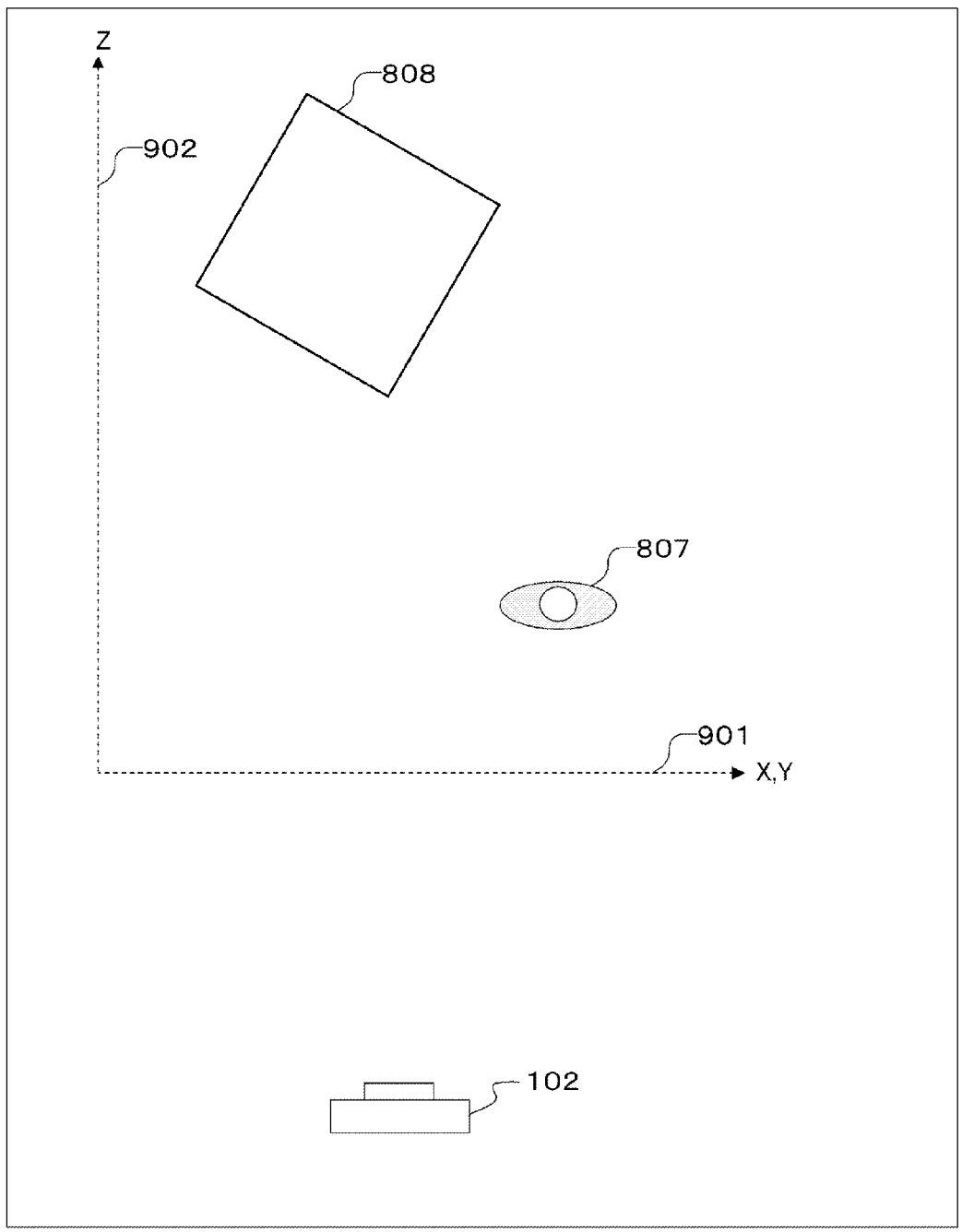
FIG. 9 is a diagram showing a spatial location of a subject coordinate according to Embodiment 1.

FIG. 9 is a conceptual diagram showing spatial locations of the subjects.

As shown in FIG. 9, an axis 901 is a two-dimensional axis (with two axes within a plane perpendicular to the depth direction) representing the vertical direction and the horizontal direction, while an axis 902 represents the depth direction, when viewed from the imaging device 102. The subject 808 in the image 806 shown in FIG. 8 is located farther from the imaging device 102 than the subject 807 is, and the positions of these subjects in the depth direction are recorded in a subject coordinate 803 of the coordinates information 801 and a subject coordinate (reference numeral of which is not shown) of the coordinates information 804. The coordinates information of the plurality of subjects that are included in the additional information of the image data contain the positional information corresponding at least to the depth direction. The coordinates information may further contain the positional information on the subjects within the plane perpendicular to the depth direction.

Figure 10:
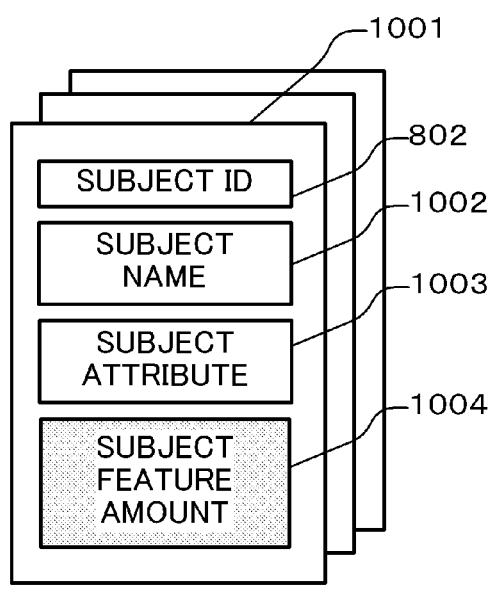
FIG. 10 is a conceptual diagram showing subject information according to Embodiment 1.

FIG. 10 is a conceptual diagram showing the subject information describing the details of the subjects corresponding to the subject IDs. The subject information can be stored in the server 101 and shared by the imaging device 102. The acquiring unit 108 of the server 101 may be configured to acquire the subject information from the additional information of the image data or from a file that is different from image data and is associated with the image data.

In FIG. 10, a plurality of pieces of the subject information can be present as much as the number of subjects. A piece of subject information 1001 is configured with the subject ID 802 unique to the corresponding, a subject name 1002, a subject attribute 1003 indicating whether the corresponding subject is a person, a building, a natural scenery or the like, and a subject feature amount 1004 indicating a shape feature unique to the corresponding subject. The subject feature amount 1004 indicates, for example, facial feature data for the purpose of individual recognition, information on a face recognition result, or information on imaging the corresponding subject, such as the shape, color, and size of an artificial object or natural object. A type of a subject included in an image is determined based on the subject attribute 1003.

FIG. 11 shows comment rule information indicating a predetermined correlation among the attribute of each subject, the relative positional relationship among the subjects, and sample comments to be created, the comment rule information being stored in a storage unit 110 of the server 101. The creating unit 106 of the server 101 creates comments based on the comment rule information.

In FIG. 11, the comment rule information is configured with a comment number 1101, an attribute 1102 of a subject A, an attribute 1103 of a subject B, a relative positional relationship 1104 between the subject A and the subject B in the depth direction, and a sample comment 1105 to be created based on these attributes and the positional relationship. In the example shown in FIG. 11, the magnitude relationship between the difference in coordinates between the depthwise positions of the two subjects and a threshold is defined as the relative positional relationship 1104. Therefore, the creating unit 106 can create a comment based on the magnitude relationship between the difference in coordinates between the positions of the two subjects and the threshold. For instance, let it assumed that the subject A is located farther from the imaging device 102 than the subject B is and that the distance between the subject A and the subject B in the depth direction is greater than the threshold. Moreover, let it assumed that the attributes of the two subjects are each "person." The sample comment that meets these conditions is the sample comment corresponding to the comment number "2" in the comment rule information that reads "A is behind B."

Although FIG. 11 illustrates an example in which two subjects are present, a correlation among three or more subjects can be defined in the same manner. In Embodiment 1, a correlation between the relative positional relationship between a subject that is a person and a subject that is not a person (a landmark, in the example shown in FIG. 11) and a sample comment is defined, as shown in FIG. 11. The creating unit 106, therefore, can create a comment based on the relative positional relationship between the subject that is a person and the subject that is not a person. Also, in Embodiment 1, the creating unit 106 creates different comments for the case in which a plurality of subjects are "person" and for the case in which a plurality of subjects include "person" and subjects that are not "person" (landmarks, in the example shown in FIG. 11), even when the relative positional relationship is the same, as shown in FIG. 11. In the comment rule information shown in FIG. 11, sample comments corresponding to the information on imaging each subject and the information on the size and shape of each subject may be defined, so that the creating unit 106 can create comments based on these additional information pieces. According to the example illustrated in FIG. 11, the correlation between the relative positional relationship between two subjects in the depth direction and a comment is defined beforehand; however, the correlation between the relative positional relationship between the two subjects within the plane perpendicular to the depth direction and a comment may be defined beforehand. In such a case, the acquiring unit 108 acquires the coordinates of the position of each subject in the depth direction and the coordinates of the position of each subject within the plane, and the computation unit 107 computes the relative positional relationship between the subjects in the depth direction and the relative positional relationship between the subjects within the plane perpendicular to the depth direction. The creating unit 106 can create a comment based on the relative positional relationship between the subjects in the depth direction and the relative positional relationship between the subjects within the plane perpendicular to the depth direction.

FIG. 12 shows an example of information on the relative positional relationship between the subjects included in the image, and this relative position table is stored in the storage unit 110 of the server 101. The information on the relative positional relationship between the subjects included in the single image file 701 is stored in the relative position table.

In FIG. 12, a single row shows the relative positional relationship between the two subjects. When, there exist two subjects, a single row is used to show the positional relationship between them. This relative positional relationship is computed by the computation unit 107 and stored in the table. In a case where the two subjects selected from among the plurality of subjects included in the image can be combined in a plurality of ways, the computation unit 107 computes the relative positional relationship for each of the plurality of combinations and stores the computed relative positional relationships in the table. For instance, when the image contains n subjects, $_nC_2$ combinations can be obtained, and therefore the relative positional relationship for each of these combinations is computed and stored in the table. The relative positional relationship between subjects represented by a subject ID 1201 and a subject ID 1202 are stored in a relative position 1203 in the form of a three-dimensional coordinate system including the depth direction and the horizontal and perpendicular directions within the plane.

A process in which the server 101 creates a comment from the image data and subject information transmitted from the imaging device 102 is described next.

Figure 13:
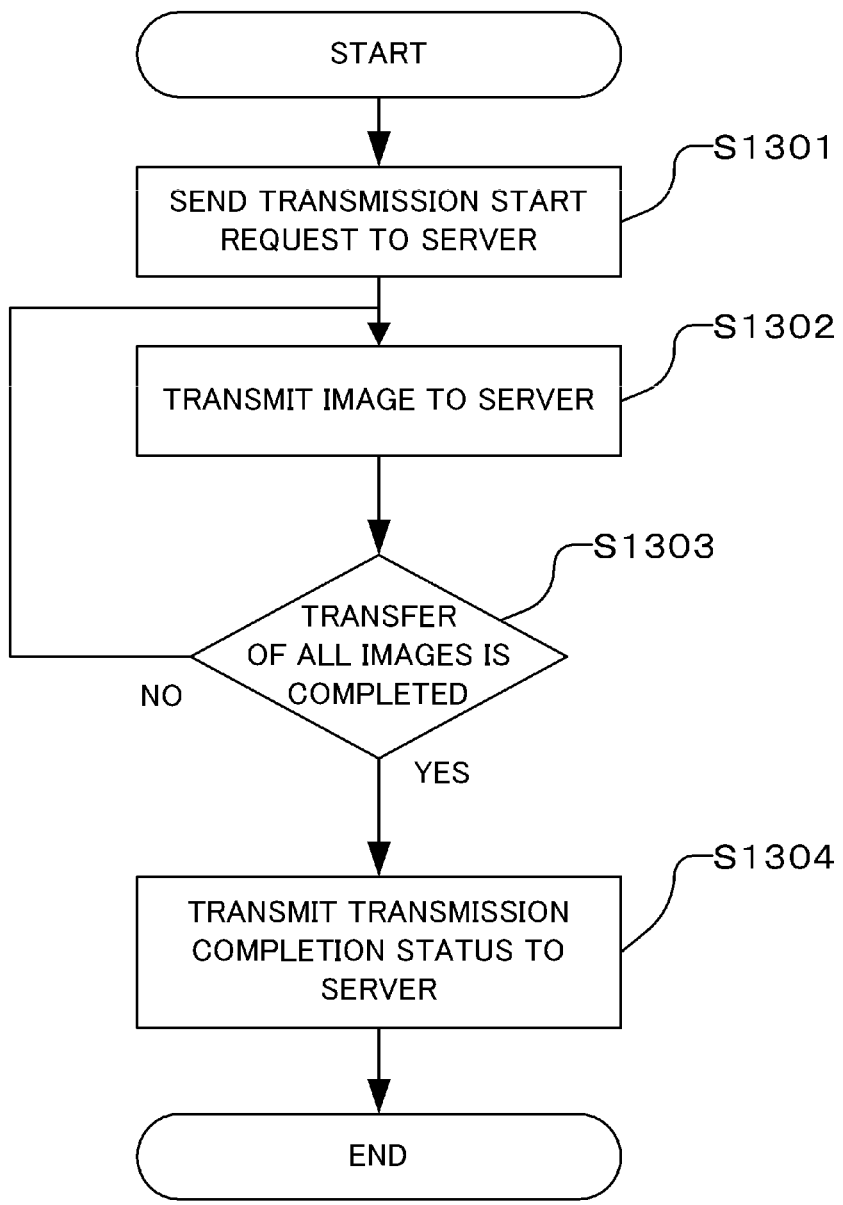
FIG. 13 is a flowchart showing a process according to Embodiment 1 in which the imaging device transmits an image to the server.

FIG. 13 is a flowchart showing the process in which the imaging device 102 transmits the image data to the server 101.

Figure 14:
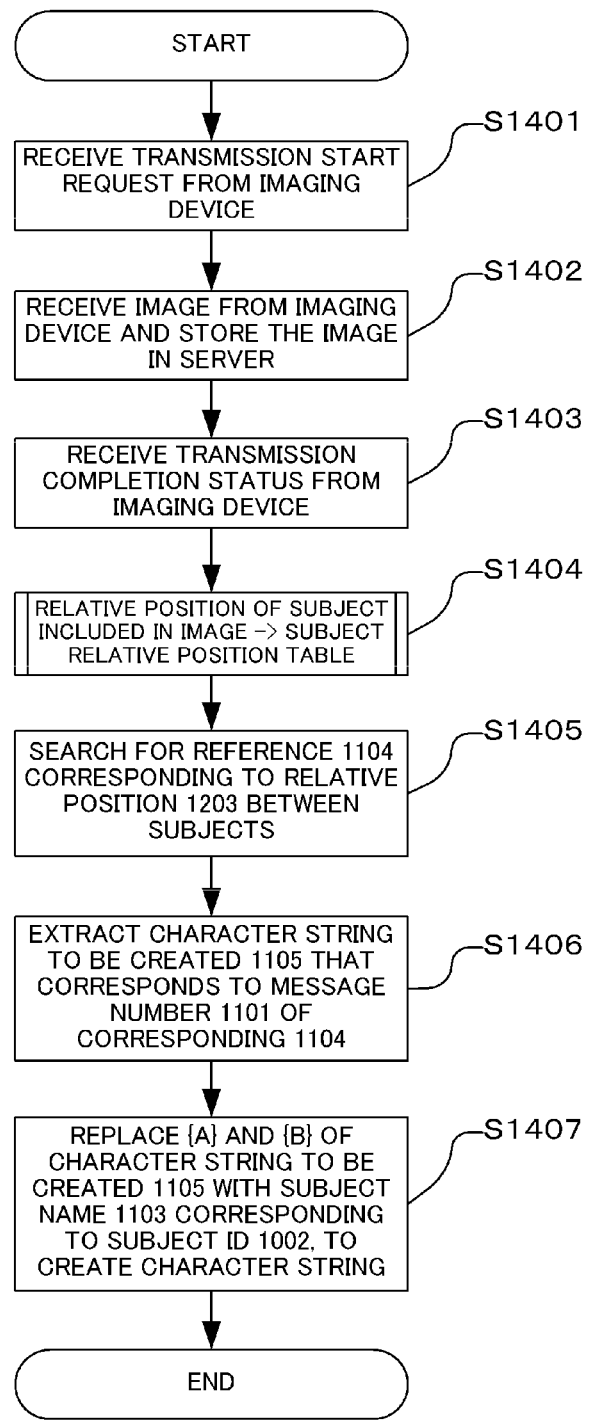
FIG. 14 is a flowchart showing a process according to Embodiment 1 in which the server creates a comment.

FIG. 14 is a flowchart showing the process in which the server 101 receives the image data from the imaging device 102 to create a comment.

In step S1301, the imaging device 102 requests to transmit an image to the server 101.

In step S1401, the server 101 receives the request and prepares to receive the image.

In step S1302, the imaging device 102 transmits image data to the server 101.

In step S1303, the imaging device 102 determines whether all image data have been transmitted. If all image data have been transmitted, in step S1304 the imaging device 102 transmits an image data transmission completion status to the server 101.

In step S1402, the server 101 receives the image data from the imaging device 102.

In step S1403, the server 101 receives the transmission completion status from the imaging device 102.

In step S1404, the server 101 computes the relative positions of a plurality of subjects included in the image file 701, stores the relative positions in the table shown in FIG. 12, and saves the relative positions in the storage unit 309 of the server 101.

In step S1405, for each piece of relative positional information in the table shown in FIG. 12, the server 101 refers to the comment rule information shown in FIG. 11 based on the relative position 1203 among the subjects and the attributes of the subjects to search for a sample comment matching the conditions.

In step S1406, the server 101 selects, from the comment rule information, a sample comment matching the conditions.

In step S1407, the server 101 replaces a part of the sample comment selected in step S1406, which corresponds to the name of each subject, with the subject name 1002 of the subject information 1001, and creates a comment corresponding to the relative positional information. The server 101 creates a comment with reference to the comment rule information, for each of the relative positional information pieces corresponding to the plurality of combinations of subjects in the table shown in FIG. 12. Note that the acquiring unit 108 may acquire the information on the position of each subject on the earth as the subject information (e.g., the geographical coordinates acquired by a GPS). In such a case, the creating unit 106 may specify the name of each subject (the name of the building, the name of the place, the name of the landmark, etc.) based on the geographical coordinates information and replace the subject name part of the sample comment. The information on each subject name based on such geographical coordinates information may be used by acquiring the information that is added to the image data as the imaging data at the time of imaging by the imaging device 102.

FIG. 12 has illustrated an example in which the relative positional relationship is computed for each of all of the possible combinations of the subjects included in the image; however, the relative positional relationship does not have to be computed for all of the combinations. For example, the relative positional relationship may be computed for the combinations of the subjects in a certain size or more within the image out of all of the subjects included in the image. In addition, FIG. 14 has illustrated an example in which steps S1404 to S1407 each create a comment based on the comment rule information for each of the relative positional relationships computed as shown in FIG. 12; however, a comment does not have to be created for each of the computed relative positional relationships. For instance, a configuration is possible in which scores representing the degrees of importance are computed for the respective computed relative positional relationships and a comment is created with respect only to the relative positional relationship with the highest score. A method capable of estimating an object for capturing an image based on the scores may be used as the method for computing the scores. For example, obtaining the sum of the areas of the two subjects within the respective images as a score increases the score of the relative positional relationship between the two subjects having presence within the image becomes high. A well-known technique can be used as the method for computing the scores.

According to Embodiment 1, when posting the image data obtained by the imaging device 102 onto the link such as a social media platform, a comment corresponding to the positional relationship between the subjects in the depth direction in the image can automatically be created and added to the image. Therefore, unlike the comment corresponding to the positional relationship within the plane of the image, the present embodiment can create a comment that precisely depicts the situation shown in the image, realizing more realistic display on the link. The created comment to be added to the image may be in the form of a title of the link, an explanatory note describing the image, an annotation such as a comment balloon, or in various other known forms. In addition, according to Embodiment 1, a comment can be created based not only on the positional relationship between the people in the image but also on the positional relationship between a person and a building in the image or between a person and the location in the image. Therefore, when an image that is captured in a tourist spot or the like for memory is posted on the link, a comment based on the information on the tourist spot that depicts the situation shown in the image more precisely can be added, enabling more realistic display on the link.

<Embodiment 2>

Embodiment 1 has described an example in which a comment is automatically created based on the relative positional relationship between subjects included in an image of the image file 701. However, even when the relative positional relationship between the subjects is not changed, there may exist a variety of ways to describe the image with comments.

Embodiment 2 illustrates an example of a process for defining a plurality of sample comments 1105 and allowing the user to select a sample comment therefrom. In Embodiment 2, a plurality of comments is associated with the same positional relationship in the comment rule information shown in FIG. 11. The input unit 111 of the server 101 receives, from the user, an instruction to select a comment from among the plurality of comments corresponding to the same positional relationship. The creating unit 106 creates a comment based on the instruction from the user.

Figure 15:
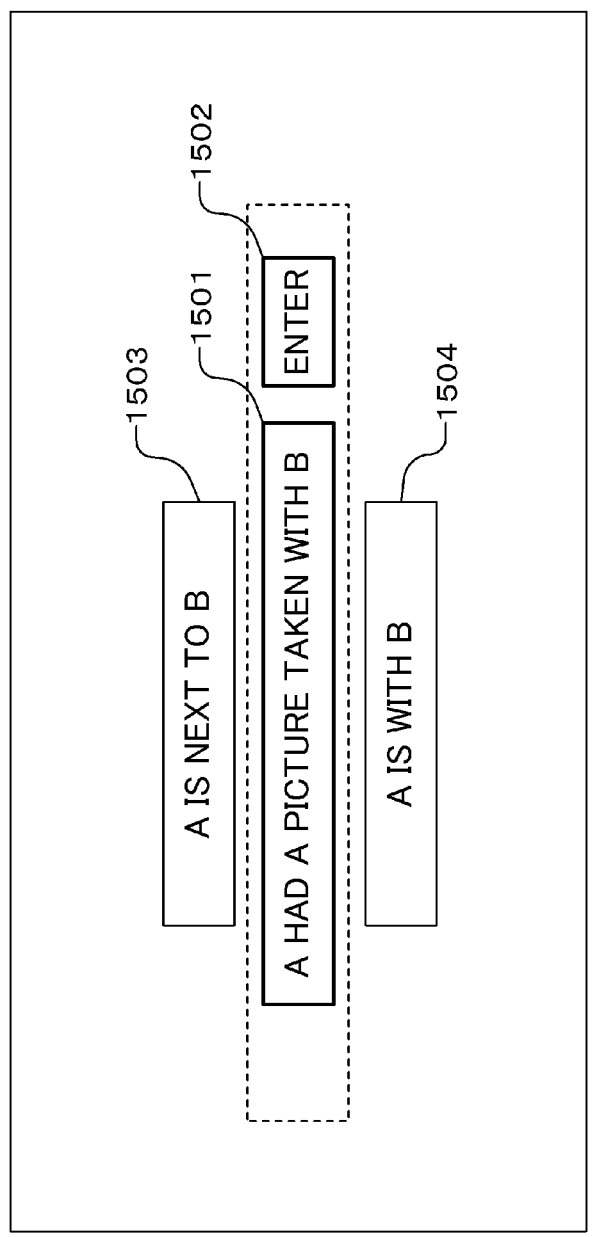
FIG. 15 shows an example of a screen according to Embodiment 2 that shows options of sample comments.

FIG. 15 shows an example of a screen according to Embodiment 2, which causes the display device 301B of the terminal device 103 to display options of sample comments.

As shown in FIG. 15, the user can select a comment from among comments 1501, 1503, 1504 by moving the desired comment to the middle and pressing a select button 1502.

Figure 16:
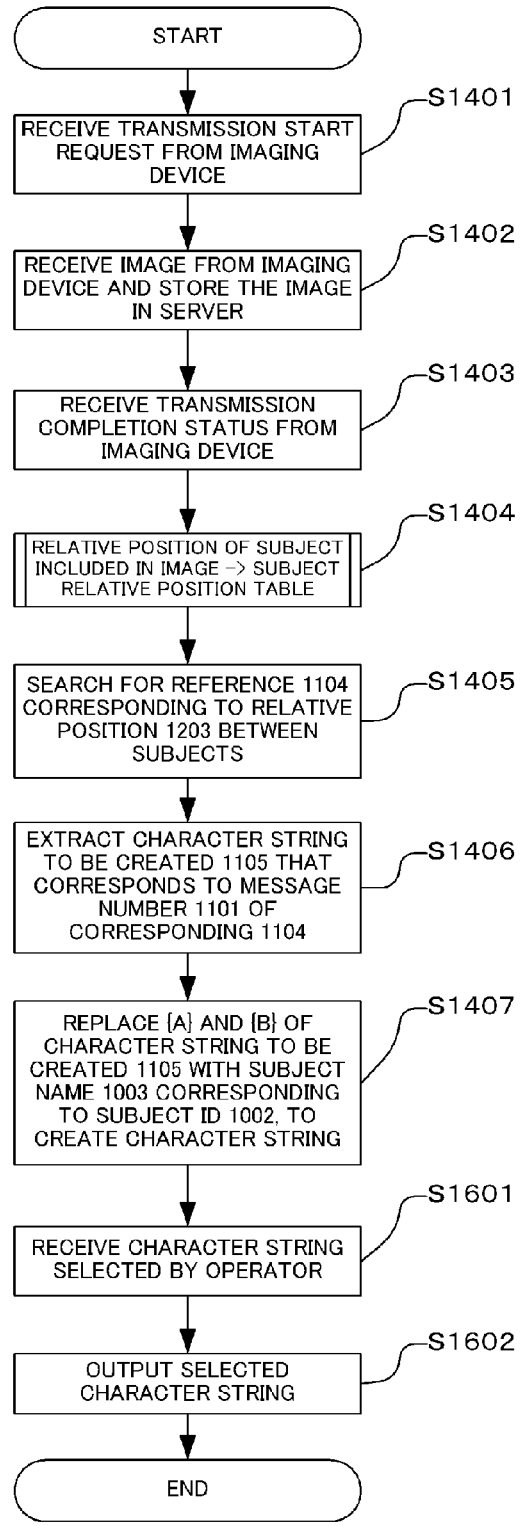
FIG. 16 is a flowchart showing a process according to Embodiment 2 in which the server creates a comment.

FIG. 16 is a flowchart showing a process according to Embodiment 2 in which the server 101 receives the image data from the imaging device 102 to create a comment. In the flowchart shown in FIG. 16, the reference numerals same as those shown in FIG. 14 are used to describe the same details as those shown in FIG. 14, and the overlapping descriptions are omitted accordingly.

Let it assumed that in step S1407 a plurality of sample comments matching the conditions for the relative positional relationship between the subjects are defined based on the comment rule information. In this case, the server 101 transmits screen data shown in FIG. 15 to the terminal device 103, the screen data providing the user with options of the plurality of sample comments. In step S1601, the user selects a desired comment using the terminal device 103, and the information on the selected comment is transmitted to the server 101. The input unit 111 of the server 101 receives the information on the sample comment selected by the user, and, in step S1602, creates a comment using the selected sample comment.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-216526, filed on Oct. 23, 2014, which is hereby incorporated by reference herein in its entirety.

What is claimed is:

1. An image management apparatus comprising:
a processor; and
a memory configured to store at least one program executable by said processor, the at least one program comprising program code that, when executed by said processor, implements units comprising:
(1) an acquiring unit configured to acquire data of an image and positional information on a subject included in the image;
(2) a computation unit configured to compute a relative positional relationship between a plurality of subjects included in the image in at least a depth direction, based on the acquired positional information on the plurality of subjects included in the image; and
(3) a creating unit configured to create comment data relevant to the image automatically, based on the computed relative positional relationship between the plurality of subjects,
wherein the creating unit creates the comment data based on a predetermined correlation between (a) the relative positional relationship between the plurality of subjects and (b) a comment.

2. The image management apparatus according to claim 1, wherein the at least one program further comprises program code that, when executed by said processor, implements a determining unit configured to determine a type of the subject included in the image based on attribute information related to the image, and
wherein the creating unit creates the comment data based on a relative positional relationship between the subject of which the determined type is a person and the subject of which the determined type that is not a person.

3. The image management apparatus according to claim 1, wherein the acquiring unit acquires information on geographical coordinates representing the position of the subject on the earth, and
wherein the creating unit creates the comment data further based on the information on the geographical coordinates of the subject.

4. The image management apparatus according to claim 1, wherein the acquiring unit further acquires any of additional information, from among information on an attribute of the subject, information on a name of the subject, information on a result of recognizing the face of the subject, information on imaging the subject, and information on a size of the subject, and
wherein the creating unit creates the comment data further based on the additional information.

5. The image management apparatus according to claim 1, wherein the creating unit creates the comment data based on a magnitude relationship between a difference in coordinates between positions of the plurality of subjects and a threshold.

6. The image management apparatus according to claim 1, wherein the computation unit computes the relative positional relationship between the plurality of subjects in the depth direction and a relative positional relationship between the plurality of subjects within a plane perpendicular to the depth direction.

7. The image management apparatus according to claim 1, wherein the acquiring unit acquires the data of the image and information on the subject from an imaging device through a network.

8. The image management apparatus according to claim 1, wherein the image management apparatus outputs, to an external device, display data for displaying the data of the image and the comment data in association with each other.

9. The image management apparatus according to claim 8, wherein the external device is a web server that provides a web service for displaying the data of the image and the comment based on the display data.

10. A control method of an image management apparatus, the control method comprising the steps of:
acquiring data of an image and positional information on a subject included in the image;
computing a relative positional relationship between a plurality of subjects included in the image in at least a depth direction, based on the acquired positional information on the plurality of subjects included in the image; and
creating comment data relevant to the image automatically, based on the computed relative positional relationship between the plurality of subjects,
wherein the comment data is created in the creating based on a predetermined correlation between (a) the relative positional relationship between the plurality of subjects and (b) a comment.

11. A non-transitory computer readable storage medium having stored thereon a computer program comprising instructions, which, when executed by a computer, cause the computer to execute the steps of:
acquiring data of an image and positional information on a subject included in the image;
computing a relative positional relationship between a plurality of subjects included in the image in at least a depth direction, based on the acquired positional information on the plurality of subjects included in the image; and
creating comment data relevant to the image automatically, based on the computed relative positional relationship between the plurality of subjects,
wherein the comment data is created in the creating based on a predetermined correlation between (a) the relative positional relationship between the plurality of subjects and (b) a comment.

* * * * *